United States Patent
Doumet

[19]

[11] Patent Number: 5,833,453
[45] Date of Patent: Nov. 10, 1998

[54] APPARATUS FOR PRODUCING BULK MATERIAL

[76] Inventor: Joseph Elie Doumet, 1 Rue Jacob, Paris 75006, France

[21] Appl. No.: 563,538

[22] Filed: Nov. 28, 1995

[30] Foreign Application Priority Data

Dec. 7, 1994 [DE] Germany ............... 44 43 589.4

[51] Int. Cl.⁶ ...................................... F27D 15/02
[52] U.S. Cl. ........................................ 432/78; 432/77
[58] Field of Search .................. 432/77, 78, 80, 432/81

[56] References Cited

U.S. PATENT DOCUMENTS 3,162,431  12/1964  Muller et al. ............. 432/78
4,059,396  11/1977  Dano ......................... 432/78

*Primary Examiner*—Philip H. Leung
*Assistant Examiner*—Jiping Lu
*Attorney, Agent, or Firm*—Reising, Ethington, Learman & McCulloch PLLC

[57] ABSTRACT

The invention relates to apparatus for producing fired bulk material, particularly cement clinker, wherein the bulk material is first fired and then cooled. The cooling of the hot bulk material takes place by gasification of a fuel, particularly coal, with steam, the reaction enthalpy necessary for the gasification reaction being extracted from the hot bulk material. In this gasification a fuel gas is also produced which is used for firing the bulk material.

7 Claims, 2 Drawing Sheets

APPARATUS FOR PRODUCING BULK MATERIAL

The invention relates to apparatus for cooling and producing fired bulk material, particularly cement clinker.

BACKGROUND OF THE INVENTION

Apparatus for producing fired bulk material, particularly cement clinker, consists essentially of a rotary kiln for firing the bulk material and a cooler connected downstream for cooling the hot bulk material.

The hot bulk material falling out of the rotary kiln is usually cooled with air to a storable and workable temperature. Approximately 75% of the heat given off into the air by the bulk material is returned directly to the rotary kiln with the air for combustion. The remaining 25% of the heat contained in the air is excess exhaust air which, if there is no external possibility of utilisation, is given off into the atmosphere as loss.

DD-A-206 422 discloses a method of producing fired bulk material wherein the bulk material is cooled by gasification of a fuel with steam, the gasification reaction extracting the necessary reaction enthalpy from the hot bulk material.

The object of the invention, therefore, is to provide apparatus for cooling or producing bulk material by means of which the quantity of heat recovered for the kiln can be increased.

SUMMARY OF THE INVENTION

This object is achieved by cooling the hot bulk material by gasification of a fuel with steam wherein the gasification reaction extracts the necessary reaction enthalpy from the hot bulk material. The fuel gas produced in the gasification reaction is used for firing the bulk material in the rotary kiln. The air for combustion which is necessary for the firing is preheated by after-cooling of the hot bulk material. With such a method it is possible to operate the final cooling of the clinker only with a utilisable quantity of air for combustion.

The fuel gas produced in the gasification reaction, particularly hydrogen and carbon monoxide, generates a high combustion temperature in the rotary kiln, as a result of which the clinker quality is improved and the rotary kiln can be of shorter dimension.

THE DRAWINGS

One embodiment according to the invention as well as further advantages of the invention are explained in greater detail with the aid of the following description and the drawings wherein FIG. 1 shows a schematic representation of apparatus according to the invention in a first embodiment, FIG. 2 shows a sectional representation along the line III—III in FIG. 1.

DETAILED DESCRIPTION

The cooling of the bulk material takes place by application of the heterogeneous water gas reaction

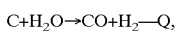

wherein a fuel gas to be used in the process is simultaneously produced. The reaction enthalpy Q which is extracted from the hot bulk material during the gasification reaction amounts to approximately 120 J/mol.

With this type of cooling of the hot bulk material the saving of thermal energy for the kiln process is up to 100 kcal/kg of bulk material.

Moreover, in the production of white cement clinker the degree of whiteness thereof can be increased by the reducing atmosphere.

Fuels to be considered are in particular coal with the most varied hydrocarbon ratios and also oil, e.g. heavy oil, having a higher proportion of hydrogen than coal.

The following applies as principal reaction equation:

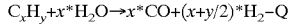

e.g. $CH_4 + H_2O \rightarrow CO + 3*H_2 - 193$ J/mol

In the production of cement clinker using the method according to the invention the heat of clinker formation is first of all used for the endothermic gasification reaction in a temperature range of approximately 1400° C. to approximately 950° to 1000° C. The fuel gas produced in this process is delivered directly to the rotary kiln 1, but some of it can also be introduced at the precalciner of the preheater tower. If the heat available from the fuel gas is not sufficient for the kiln process, the additional heat requirement is met by a conventional auxiliary furnace.

The necessary air for combustion is preheated by after-cooling of the hot clinker which is at approximately 850° C. With corresponding dimensioning of the cooler this makes it possible to operate the cooler without exhaust air and thereby saves considerably on investment and operating costs.

Certain components of the reactor which must be cooled for reasons of the thermal service life of the material can be effectively protected with cooling water, and the heated water can be used for generating the steam.

The ash contained in the fuel introduced for the gasification does not influence the clinker chemistry and does not have to be taken into account in the raw meal recipe. Furthermore, more economical fuels with higher sulphur content can be used for the gasification. The ash and the free lime content of the clinker form compounds with hydraulic properties. In this reaction sequence sulphur is absorbed particularly well and bound in the form of sulphate. By comparison with the direct introduction of fuel, the internal sulphur cycle in a kiln installation is relieved thereby and at the same time the necessary addition of gypsum for the cement grinding can be reduced by the sulphate formation on the clinker.

Figure 1:
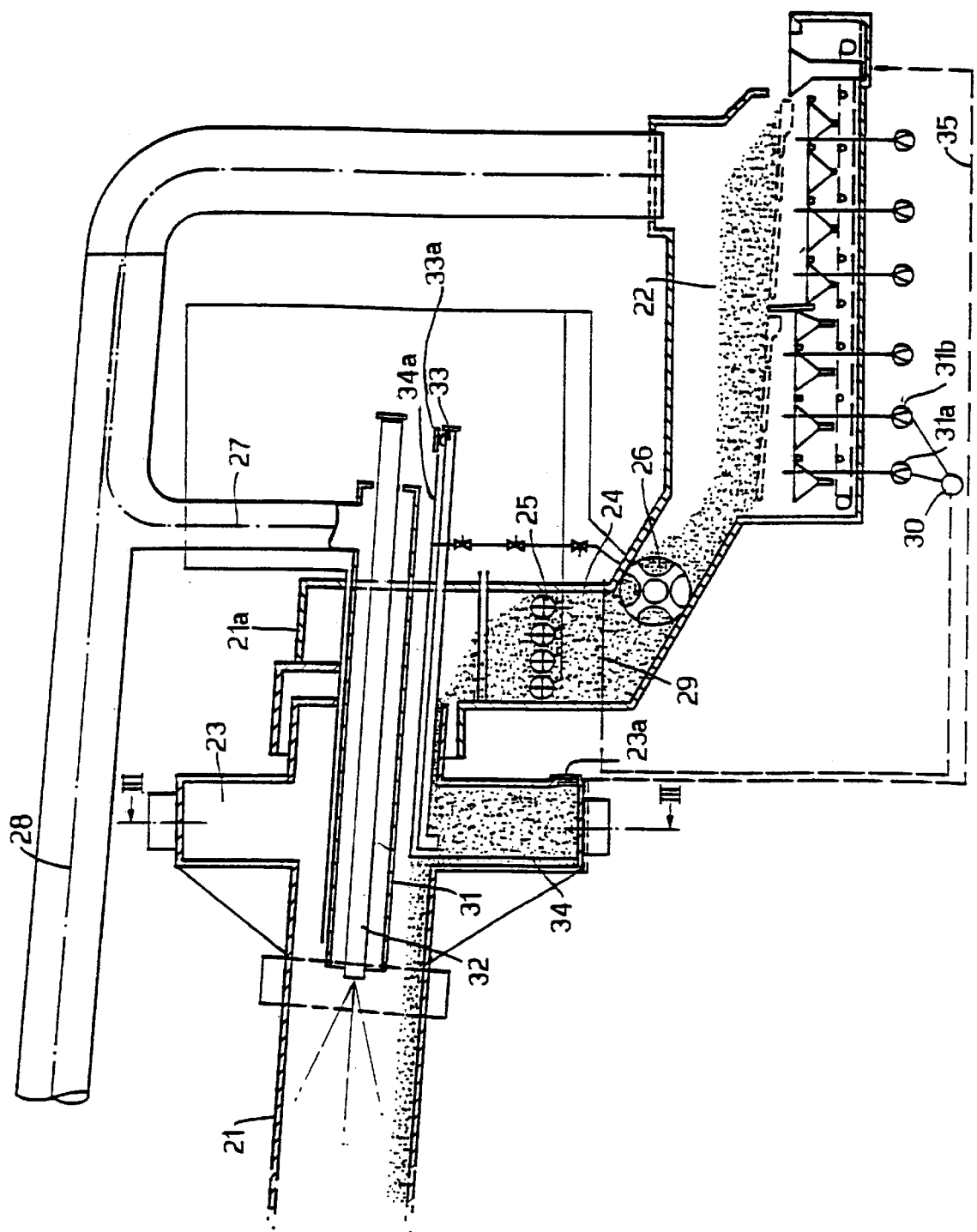
Figure 2:
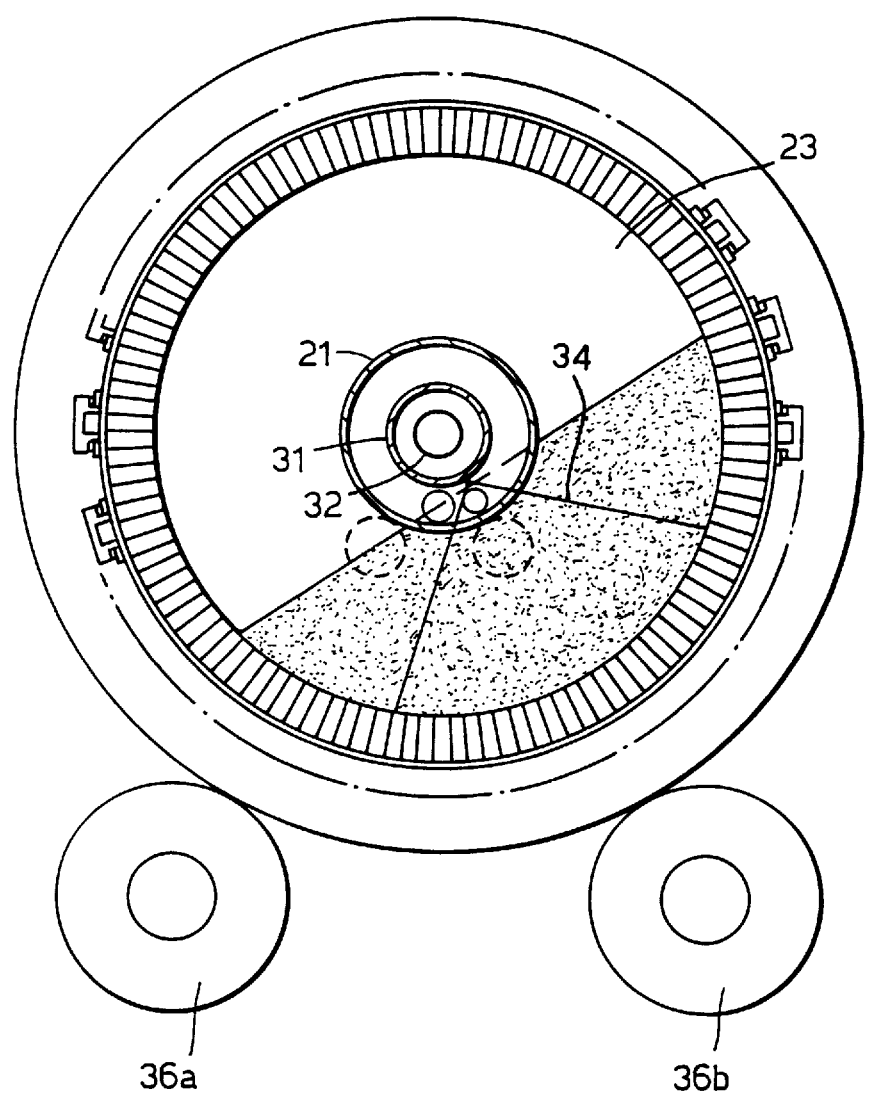

FIGS. 1 and 2 show an apparatus according to the invention for producing fired bulk material. It consists essentially of a rotary kiln 21 for firing the bulk material, a cooler 22 connected downstream for cooling the hot bulk material and a reactor 23 for pre-cooling the hot bulk material by gasification of a fuel with steam, the gasification reaction extracting the necessary reaction enthalpy from the hot bulk material.

In the illustrated embodiment the reactor 23 is constructed as a part of the rotary kiln with enlarged diameter and is disposed at the outlet end of the kiln. The rotary kiln 21 has at its outlet end a kiln hood 21a which constitutes the transition from the kiln to the cooler.

The kiln hood 21a as well as the connecting arrangement 24 are constructed in the conventional manner. A crusher, preferably a roll crusher 25, which is advantageously cooled from the inside by demineralised water, is disposed in the connecting arrangement 24. Here the clinker is crushed for example to a particle size of 25 mm before it passes to a rotary vane gate 26 which delivers the clinker to the cooler 22. The rotary vane gate 26 is preferably also cooled from the inside with demineralised water.

In the cooler 22 the bulk material which has already been pre-cooled is further cooled by means of air. The cooling air heated thereby is used in the apparatus as secondary air 27 or tertiary air 28 in the usual way as air for combustion.

A pressure-measuring device 29 is provided in the connecting arrangement 24 shortly before the rotary vane gate 26, and by way of a control device 30 this pressure-measuring device controls the speed of the first two fans 31a and 31b of the cooler 22 in such a way that no pressure builds up in the region of the pressure-measuring device 29.

The secondary air 27 generated by the cooler 22 is introduced into the rotary kiln 21 in the region of the kiln hood 21a by way of a secondary air line 31. The secondary air line 31 is of double-walled construction and is cooled with demineralised water. In the centre of the secondary air line 31 there is provided an additional burner 32 for any fuel which supplements the fuel from the gasification process which may not be sufficient. This burner 32 is also used for starting up the rotary kiln.

The secondary air flowing through the secondary air line 31 has a temperature of approximately 750° C. and burns the fuel gas produced in the reactor 23.

The reactor 23 illustrated in this embodiment is approximately three times greater in diameter than the rotary kiln 21, and the width of the reactor corresponds to approximately ⅕ of its diameter. The dimensioning of the reactor 23 allows the clinker a sufficient residence time in the reactor for the gasification process. Due to the comparatively large diameter the large lumps of clinker are also crushed in the reactor 23. Moreover, the cement clinker is mixed in an optimal manner with the coal or another fuel for the gasification. In order to assist this process, the reactor can also be provided with ceramic lifters for lifting the cement clinker. The rotation of the rotary kiln/reactor arrangement leads to a constant intermixing of the fuel to be gasified with the cement clinker.

In addition to the usual support for the rotary kiln 21 by way of at least two supporting roller stands, in the illustrated embodiment the reactor 23 is also supported by way of supporting rollers 36a, 36b.

However, the dimensioning of the reactor 23 should be understood merely as an example and can be varied depending upon the reactivity of the fuel.

The reactor 23 also has an arrangement constructed as a screw conveyor 33 for delivery of a fuel, in particular coal. The screw conveyor is again of double-walled construction and is cooled with demineralised water. The feed point for the fuel lies in the inlet region of the hot bulk material into the reactor 23.

The saturated steam required for the gasification process is obtained completely or partially from the cooling water from the various apparatus parts described above.

Furthermore, the reactor 23 has an arrangement 34 for blowing steam from a pipe 34a adjacent the conveyor 33 under the control of a valve 33a into the bulk material which is intermixed with the fuel. This arrangement is disposed parallel to the walls delimiting the reactor 23 and is constructed in the form of a plate, the edges of which are chamfered in order to provide the least possible resistance for the clinker coming into the reactor. The steam will preferably stream out in the region of the base of the reactor 23.

If liquid fuel is used for the gasification process, or for example methane gas, these fuels are delivered to the reactor with a similar arrangement to that used for blowing in the steam.

The arrangement 34 for introducing the steam is normally provided so as to be stationary. However, it can also be disposed so as to be movable to and fro in the direction of the rotational movement of the rotary kiln/reactor arrangement, in order to reach the most effective location for the gasification process.

At the lower end of the reactor 23 a closable opening 23a is also provided in order to transport the clinker located in the reactor to the cooler by way of a conveying arrangement 35, represented by broken lines, when a longer kiln stop is necessary.

When the rotary kiln/reactor arrangement is being started, the additional burner located in the secondary air line 31 is used. If the fuel/hydrogen ratio has adjusted to the gasification capacity of the reactor 23 the combustion process can be operated independently of the additional burner 32, in which case the fuel consumed, the regulation of the flame and the quantity of fuel delivered to the rotary kiln as well as the degree of pre-calcination must be taken into consideration.

With the aid of the reactor described above the hot bulk material passes into the cooler having already been pre-cooled, so that the entire quantity of air to be used in the cooler can be used as secondary or tertiary air in the other parts of the apparatus. Therefore there is no excess quantity of heat which must be given off into the atmosphere. In this way between 75 and 100 kcal/kg of energy can be saved. Furthermore, it is possible to dispense with filters and cleaning arrangements for the quantities of air which would otherwise be given off into the atmosphere. The gas ($CO + H_2$) produced in the reactor meets the secondary air with a temperature of 1000° C., whilst the secondary air is at approximately 750° C. Therefore the temperature of the flame can easily reach temperatures between 2300° and 2500° C. The burning process can be controlled much more easily due to this high temperature of the flame. Also the coating of the clinker which is necessary for the protection of the lining of the sintering zone can be controlled much more simply.

When the burnt material, i.e. the cement clinker, reaches the reactor it is quenched practically immediately by the pyrolysis of the fuel, so that its temperature drops by 250° C. within a few minutes. The gasification reaction is then continued until the temperature has reached approximately 950° to 100° C.

The hydraulic properties of the cement clinker are substantially improved by the immediate quenching by approximately 250° C., resulting in an improved cement clinker quality.

The fuel ashes used in the gasification reaction do not have to be taken into account in the composition of the raw material. These ashes form a filler in the clinker. Pit coal and brown coal with high proportions of ash as well as coals with high volatile components can therefore be used. The fuel supplied to the reactor 23 does not have to be either dried or crushed and can be delivered in the form of 5 to 10 mm particles.

Due to the rapid quenching the calcium sulphates and alkali sulphates decompose substantially less than in the normal cooling air, so that a large proportion remains in the clinker. As a result the sulphur problems of the rotary kiln are substantially simplified and it is possible to use fuels with a higher sulphur content. The sulphur of the gasified fuel remains in the clinker as calcium sulphide.

Using the rector according to the invention it is possible to produce both white cement clinker and the normal grey cement clinker in any rotary kiln, since the gasification reaction cools the white clinker in the presence of highly reducing gases (CO and $H_2$), so that the degree of whiteness of the cement is greatly improved.

Due to the chemical decomposition of the water, substantially less nitrogen is produced in the rotary kiln gases and in the preheater. Depending upon the quality of the gasified fuel, the volume of gas can be reduced by 10 to 14%, so that again energy is saved.

I claim:

1. In apparatus for producing fired bulk material having a rotary kiln for firing said material, a cooler connected to said kiln for receiving hot material from said kiln and cooling said material, first means for delivering fuel to and mixing said fuel with the hot material, and second means for passing steam into the mixed material and fuel to effect a gasification reaction and extraction of reaction enthalpy from such material, the improvement comprising a reactor mounted on said kiln and containing said first and second means.

2. Apparatus according to claim 1 wherein said kiln and said reactor are cylindrical and wherein said reactor has a diameter greater than that of said kiln.

3. Apparatus according to claim 2 wherein said reactor has a diameter about three times greater than that of said kiln.

4. Apparatus according to claim 3 wherein said reactor has a width about one-fifth of its diameter.

5. Apparatus according to claim 1 wherein said kiln has a discharge end and wherein said reactor is immediately upstream of said discharge end.

6. Apparatus according to claim 1 wherein the means for passing steam into the mixed material includes a plate having edges past which steam flows.

7. Apparatus according to claim 1 wherein said reactor has an inlet end through which the hot material passes from said kiln into said reactor, said fuel being delivered and mixed with said material adjacent said inlet end.

* * * * *